United States Patent
Wiant et al.

(10) Patent No.: US 7,224,577 B2
(45) Date of Patent: May 29, 2007

(54) MOUNTING PLATE SYSTEM

(75) Inventors: Jason P. Wiant, Bedford, TX (US); Harry W. Josten, Grapevine, TX (US); Robert D. Meyer, Arlington, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 183 days.

(21) Appl. No.: 10/967,933

(22) Filed: Oct. 19, 2004

(65) Prior Publication Data

US 2006/0082954 A1 Apr. 20, 2006

(51) Int. Cl.
H02B 1/20 (2006.01)
H02B 5/00 (2006.01)

(52) U.S. Cl. .............. 361/605; 361/611; 361/652; 361/655; 361/656

(58) Field of Classification Search .............. None
See application file for complete search history.

(56) References Cited

U.S. PATENT DOCUMENTS

| | | | |
|---|---|---|---|
| 4,180,846 A * | 12/1979 | Wilson et al. | 361/643 |
| 4,472,761 A * | 9/1984 | Koslosky et al. | 361/638 |
| 4,933,519 A | 6/1990 | Milianowicz et al. | |
| 5,295,041 A * | 3/1994 | Metivier et al. | 361/622 |
| 5,535,102 A | 7/1996 | Neill et al. | |
| 5,847,321 A * | 12/1998 | Carle et al. | 174/99 B |
| 5,894,405 A | 4/1999 | Fleege et al. | |
| 5,899,545 A | 5/1999 | Besserer et al. | |
| 5,943,207 A | 8/1999 | Kim | |
| 5,950,974 A | 9/1999 | Hoffmann | |
| 5,992,646 A | 11/1999 | Benner et al. | |
| 6,030,063 A | 2/2000 | Benner | |
| 6,075,692 A * | 6/2000 | Potonniee et al. | 361/649 |
| 6,078,017 A | 6/2000 | Blessitt et al. | |
| 6,155,660 A * | 12/2000 | Nicolai | 312/223.1 |
| 6,164,460 A | 12/2000 | Reuter | |
| 6,190,081 B1 | 2/2001 | Besserer et al. | |
| 6,284,991 B1 | 9/2001 | Fasano et al. | |
| 6,315,132 B1 | 11/2001 | Hartel et al. | |
| 6,331,685 B1 | 12/2001 | Maldonado-Cortés | |
| 6,402,572 B1 * | 6/2002 | Sevier et al. | 439/748 |
| 6,509,523 B2 | 1/2003 | Ramdohr et al. | |
| 6,575,657 B1 * | 6/2003 | Reuter et al. | 403/231 |
| 6,615,998 B2 | 9/2003 | Klassen et al. | |
| 6,637,842 B2 | 10/2003 | Elm et al. | |
| 6,680,842 B1 | 1/2004 | Pelaez et al. | |
| 6,776,464 B2 | 8/2004 | Klassen et al. | |
| 6,776,465 B2 | 8/2004 | Klassen et al. | |
| 6,777,627 B1 | 8/2004 | Stevenson | |

* cited by examiner

*Primary Examiner*—Boris Chervinsky

(57) ABSTRACT

A method and a mounting plate system for electrical equipment in a switchgear cabinet having spaced apart frame members. The mounting plate system comprises a first mounting plate having a plurality of orifices located proximate an outer edge of the first mounting plate. A second mounting plate having a plurality of orifices located proximate an outer edge of the second mounting plate, wherein the first and second mounting plates are configured to couple to the electrical equipment in the frame members, releaseably secure the electrical equipment to the frame member from the rear of the switchgear cabinet and facilitate removal of the electrical equipment from the front of the switchgear cabinet. Another embodiment, the mounting plate system provides one of the first and second mounting plates defining a through-hole configured to accept the wire.

20 Claims, 3 Drawing Sheets

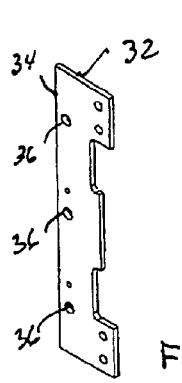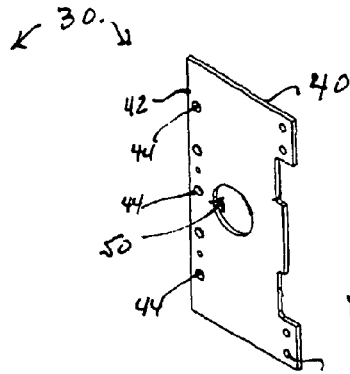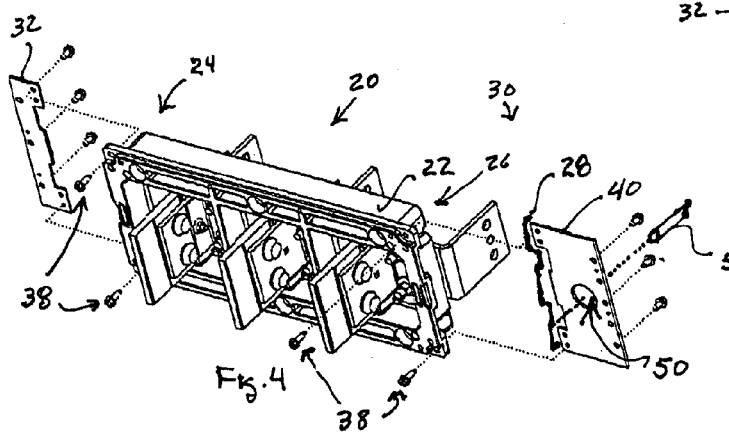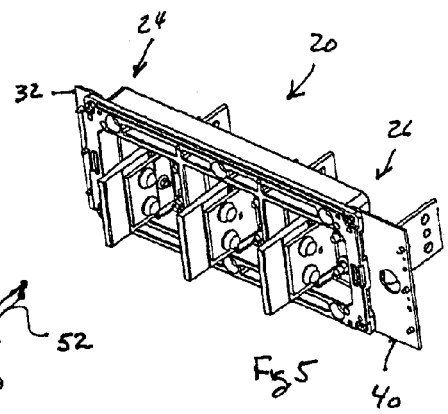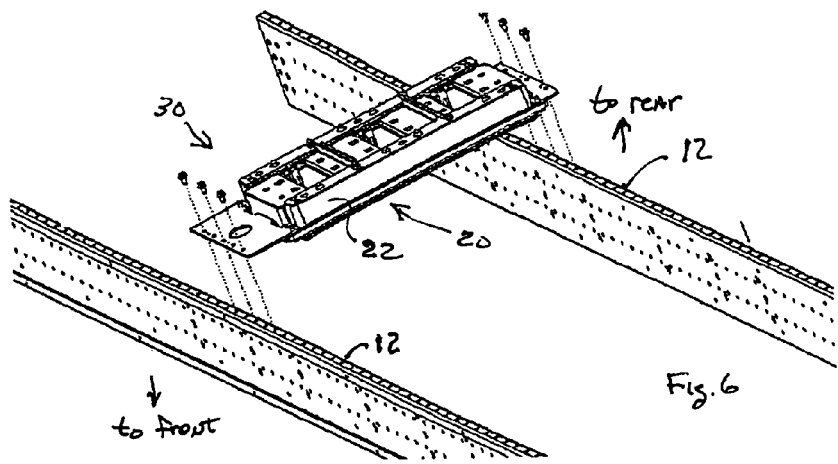

MOUNTING PLATE SYSTEM

BACKGROUND OF THE INVENTION

The present invention relates generally to the field of electrical switchboards and panel boards and more particularly to a mounting plate system used to attach or remove electrical equipment in switchboard and panelboard cabinets.

Switchgear assemblies and switchboards and panelboards are general terms which cover metal enclosures, housing switching and interrupting devices such as fuses, and circuit breakers, along with associated control, instrumentation and metering devices. Such assemblies typically include associated bus bars, interconnections and supporting structures used for the distribution of electrical power. Low voltage switchgear and switch boards operate at voltages of up to 600 volts and with continuous currents up to 5000 amps or higher. Such devices are also designed to withstand short circuit currents ranging up to 200,000 amps (3 phase RMS symmetrical).

Typical switchgear equipment is composed of a lineup of several metal and closed sections. Each section may have several circuit breakers stacked one above the other vertically in the front of the section with each breaker being enclosed in its own metal compartment. Each section has a vertical or section bus which supplies current to the breakers within the section via short horizontal branch busses. The vertical bus bars in each section are supplied with current by a horizontal main bus bar that runs through the lineup of metal and closed sections. A typical arrangement includes bus bars for each electrical phase of a multiple phase system which may include three power phases and a neutral.

During typical initial fabrication and assembly of the switchgear enclosures, it is desirable to install the rear wall of the breaker compartments from the rear (top down assembly) with the rear member of the switch gear cabinet facing upward. The vertical (section) bus is then installed top down onto the back of the rear wall of the enclosure. Subsequent assembly of the horizontal main busses and other components in the rear of the section makes removal of the rear wall of the switchgear and enclosure, from the rear, impossible without first disassembling the other structures.

Thus there is a need for a mounting plate system to enable the removal and replacement or installation of electrical equipment and more particularly the base member of electrical equipment, in the rear wall of the switchgear enclosure from the front aspect of the enclosure. There is a further need for a mounting plate system that couples to frame members of the switchgear enclosure to mount the electrical equipment in the enclosure.

SUMMARY OF THE INVENTION

There is provided a mounting plate system for electrical equipment in a switchgear cabinet having spaced apart frame members. The mounting plate system comprises a first mounting plate having a plurality of orifices located proximate an outer edge of the first mounting plate. A second mounting plate having a plurality of orifices located proximate an outer edge of the second mounting plate, wherein the first and second mounting plates are configured to couple to the electrical equipment in the frame members, releaseably secure the electrical equipment to the frame member and facilitate removal of the electrical equipment from the front of the switchgear cabinet. Another embodiment, the mounting plate system provides one of the first and second mounting plates defining a through-hole configured to accept the wire.

There is also provided an arrangement for mounting electrical equipment in a switchgear cabinet between two frame members. The arrangement for mounting comprises a first mounting plate configured to releaseably couple to the electrical equipment and one of the frame members. A second mounting plate is configured to releaseably couple to the electrical equipment and the other frame member. The first mounting plate secures one side of the electrical equipment to one frame member and the second mounting plate secures another side of the electrical equipment to the other frame member. The mounting plates are configured to facilitate installation of the electrical equipment from the rear and removal of the electrical equipment from the front of the switchgear cabinet.

There is also provided a method for mounting an electrical equipment to at least two frame members in a switchgear cabinet, with the cabinet having a front side and a rear side. The method comprises the steps of providing a first mounting plate. Coupling the first mounting plate to one side of the electrical equipment. Coupling the first mounting plate to one of the frame members. Providing a second mounting plate. Coupling the second mounting plate to another side of the electrical equipment. Coupling the second mounting plate to another of the frame members. The electrical equipment is releaseably secured in the cabinet for removal from the front side of the cabinet. Another embodiment of the method includes the step of decoupling the first and second mounting plates from the electrical equipment and removing the electrical equipment from the front of the cabinet.

There is further provided a switchgear cabinet to house electrical equipment. The cabinet comprises a housing, having a front side and a rear side. A pair of spaced apart frame members vertically mounted in the cabinet and a mounting plate system for the electrical equipment. The mounting plate system for electrical equipment comprises a first mounting plate having a plurality of orifices located proximate the outer edge of the first mounting plate. A second mounting plate having a plurality of orifices located proximate an outer edge of the mounting plate, wherein the first and second mounting plates are configured to couple to the electrical equipment and the frame members and releaseably secure the electrical equipment to the frame member for removal from the front side of the cabinet.

BRIEF DESCRIPTION OF THE DRAWINGS

FIG. 2 is a perspective view of an exemplary embodiment of a mounting plate.

FIG. 3 is a perspective view of an alternative exemplary embodiment of a mounting plate defining a through-hole for a wire.

FIG. 4 is an exploded perspective view of an electrical equipment base assembly including a first mounting plate aligned to couple to one side of the electrical equipment base and a second mounting plate aligned to couple to another side of the electrical equipment base.

FIG. 5 is a perspective view of an electrical equipment base including a mounting plate system.

FIG. 6 is a partial perspective view of an exemplary embodiment of an electrical equipment aligned for attachment to spaced apart frame members of the switchgear cabinet.

DETAILED DESCRIPTION OF THE EXEMPLARY EMBODIMENTS

Before describing the exemplary embodiments of a mounting plate system for electrical equipment and a switchgear enclosure assembly, several comments are appropriate. Switchgear assemblies and panel board assemblies typically include vertical (section) bus bars to distribute electrical power within the assemblies. In a short circuit condition, extreme magnetic forces are created in the bus bars as a result of short circuit currents up to and including 200,000 amps symmetrical RMS flowing through such bus bars. In a three phase power system (typically) as the short circuit currents flow through such bus bars, magnetic forces between adjacent bus bars have to move such bus bars laterally (perpendicular) to the current flow. Such movement of the bus bars is typically prohibited or inhibited to avoid damage and arcing within the switchgear closures by bus base comb assemblies and equipment arrangements within the switchgear cabinet.

Figure 1:
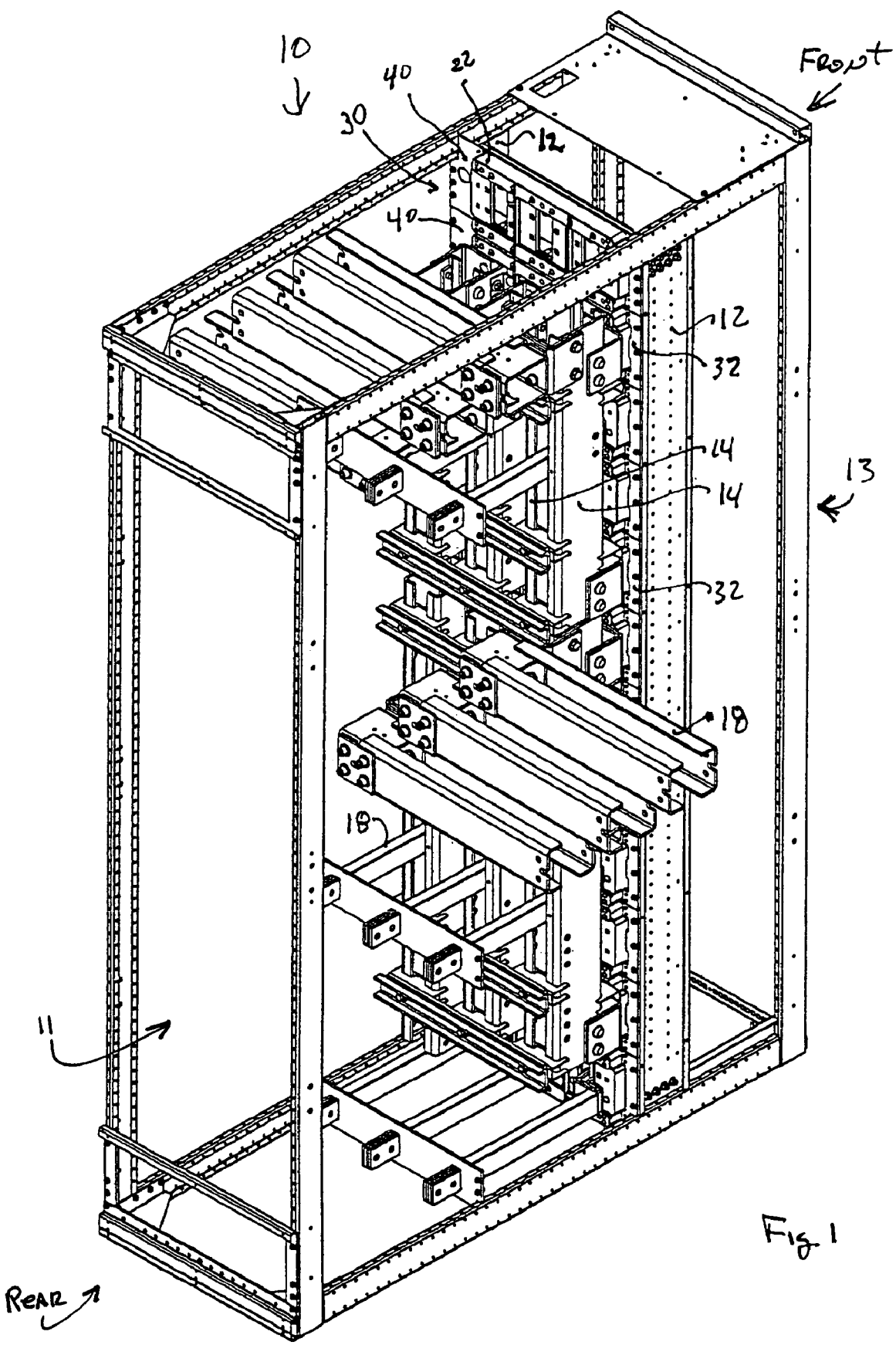
FIG. 1 is a perspective view of an exemplary embodiment of a partial multiple phase switchgear cabinet with mounted bus bars, frame members, including an exemplary embodiment of a mounting plate system for electrical equipment.

Referring now to the figures, FIG. 1 is an illustration of an exemplary embodiment of a switchgear cabinet 10, without the outer panels for clarity purposes and without circuit breakers or switchgear or control apparatus. However, FIG. 1 does include several base assemblies of circuit breaker type electrical equipment 20 coupled to frame members 12 of the switchgear cabinet 10 by a mounting plate system 30. FIG. 1 specifically depicts a multiphase switchgear assembly conventionally having power phases, A B and C. A neutral bus or grounding bus can also be provided. Vertical bus bars 14 extend typically throughout the height of the switchgear assembly 10 with horizontal bus bars 18 selectively positioned and connected (mechanically and electrically) to the vertical bus bars 14 for the distribution of power within the system. Spaced apart frame members 12 are mounted within the switchgear cabinet 10 at predetermined positions to support electrical equipment 20 mounted in the cabinet 10. The equipment can be accessed from either the front side 13 or back side 11 of the cabinet 10.

A type of electrical equipment 20 that is mounted in a switchgear cabinet 10 is a circuit breaker. A circuit breaker mechanism is typically contained within a housing. The housing is coupled to a base assembly 22 which supports the circuit breaker housing and provides an apparatus for coupling the circuit breaker to the various bus bars within the switchgear cabinet 10. The mounting plate system 30 is used to attach the base member 22 of the electrical equipment 20 to the frame members 12 of the switchgear cabinet 10.

FIGS. 2–5 illustrate an exemplary embodiment of the mounting plate system 30 for electrical equipment 20 for a switchgear cabinet 10. A first mounting plate 32 is configured to couple to a first side 24 of the rear surface of base member 22. A plurality of orifices 36 are located proximate an outer edge 34 of the mounting plate 32. A second mounting plate 40 is configured to couple to another side or second side 26 of the rear surface of base member 22 of the electrical equipment 20. The second mounting plate 40 has a plurality of orifices 44 located proximate an outer edge 42 of the second mounting plate 40. FIG. 4 illustrates an exemplary embodiment of an alignment of a first and second 32, 40 mounting plate with the base member 22 of the electrical equipment 20.

Fasteners are used to couple the first and second mounting plates 32, 40 to the base member 22. FIG. 5 illustrates an assembled electrical equipment 20 base member 22 with a mounting plate system 30 coupled to it. The first and second mounting plates 32, 40 are coupled to the rear surface of frame members 12 (see FIG. 6) to releaseably secure the electrical equipment 20 to the frame members 12 and facilitate removal of the electric equipment 20 from the front 13 from the switchgear cabinet 10. Such arrangement also assists in the structural integrity of the switch gear cabinet.

In operation, an operator would, for example, unscrew the fasteners 38 that hold the mounting plate system 30 to the base assembly 22 in order to remove the base assembly 22 from the switch gear cabinet 10.

In some applications, an insulation barrier 28 can be interposed between the base member 22 of the electrical equipment 20 and one or the other mounting plates 32, 40 of the mounting plate system 30. An insulation barrier 28 would typically be used if the mounting plates 32, 40 are comprises of metal such as steel or aluminum. It should be understand that the mounting plates 32, 40 can be composed of an insulating composite material such as plastic or reinforced plastics or a combination of metal and composite materials. The mounting plates 32, 40 can be configured, for example with notches along an edge, to support the insulation barrier 28.

An alternative embodiment of a mounting plate is illustrated in FIG. 3 wherein the mounting plate 40 defines a through-hole 50 to accept a wire 52. Various size wires can be routed through the through-hole 50 for control and communication wiring, for example.

The mounting plate system 30 enables a top down assembly of the base members 22 to the switchgear cabinet 10 frame members 12 during initial construction of the switchgear cabinet 10. The mounting plate system 30 allows removal and installation of base members 22 from the front 13 of a completed switchgear cabinet 10. Such configuration includes maintainability of the switchgear assembly, for example replacement of damaged base members 22 or other electrical equipment mounted in the switchgear cabinet.

The mounting plate system 30 also allows blank base members 22 to be mounted to frame members 12 within the switchgear cabinet 10 to act as space maintainers between electrical equipment 20. At a later date the blank base members 22 can be replaced with appropriate electrical equipment 20. It is also contemplated that the first and second 32, 40 mounting plates of the mounting plate system 30 can be configured differently to allow an offset either to the left or right to create appropriate space on one side of the circuit breaker compartment or to accommodate different size electrical equipment 20.

Figure 7:
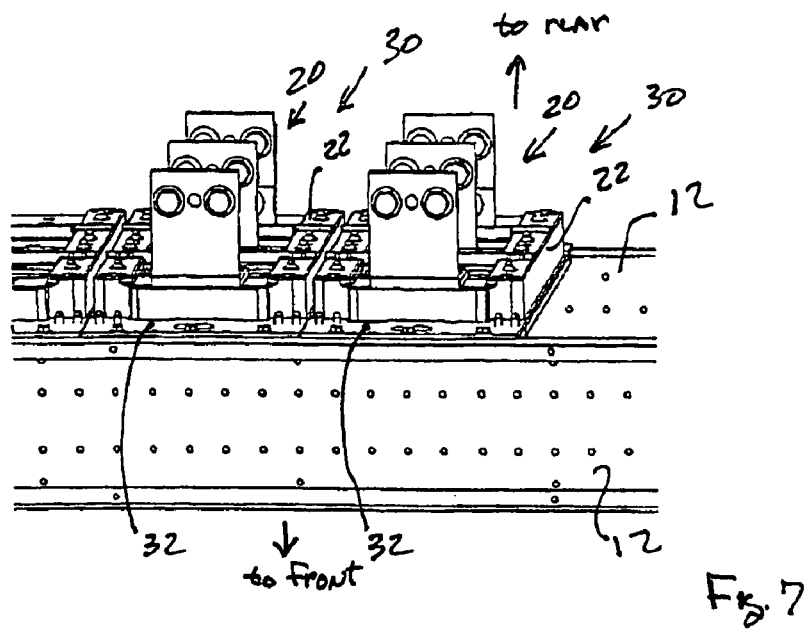
FIG. 7 is a partial side perspective view of several electrical equipment base assemblies coupled to spaced apart frame members of an electrical equipment cabinet by an exemplary embodiment of the mounting plate system.
Figure 8:
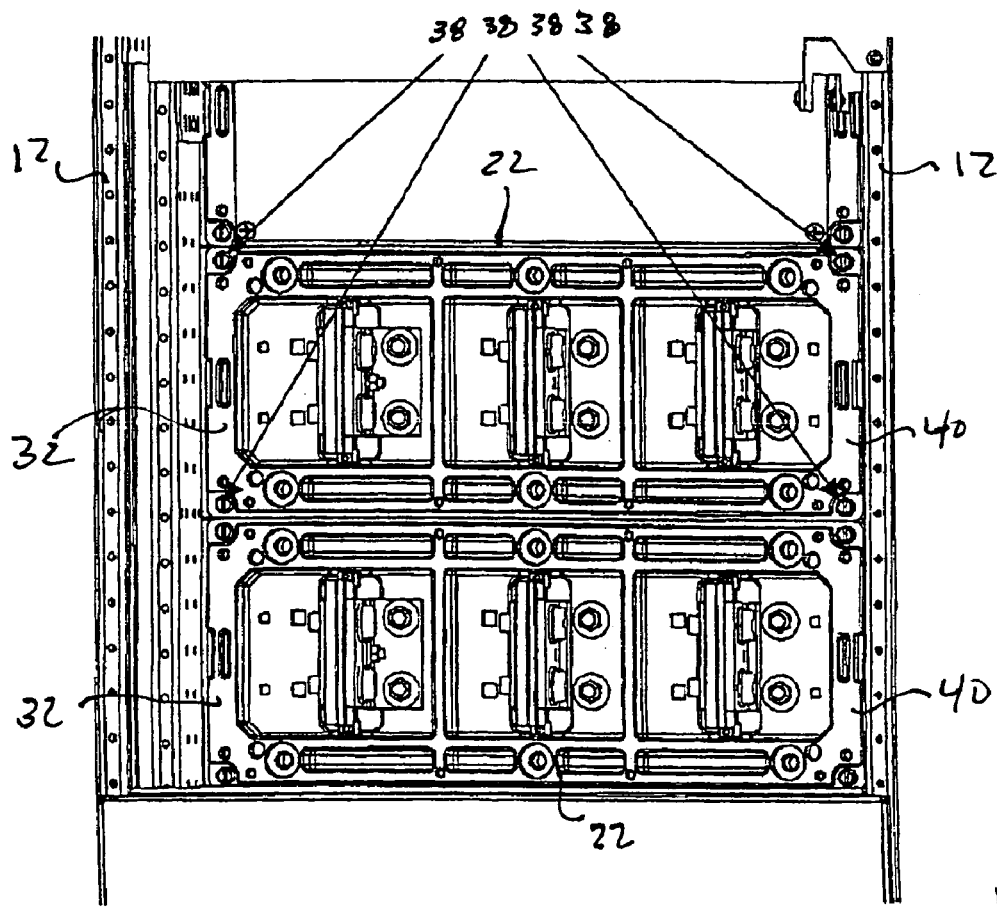
FIG. 8 is a partial, front view of several electrical equipment base assemblies coupled to spaced apart frame members of an electrical equipment cabinet by a mounting plate system on each electrical equipment base assembly.

An exemplary arrangement of mounting electrical equipment 20 between two frame members 12 is illustrated in FIGS. 6–8. A first mounting plate 32 is configured to releaseably couple to one side 24 of the electrical equipment 20 base member 22 and one frame member 12. A second mounting plate 40 is configured to releaseably couple to another side 26 of the base member 22 of the electrical equipment 20 and to the other frame member 12 within a switchgear cabinet 10.

For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

FIGS. 7 and 8 illustrate an example of electrical equipment, base members 22 mounted adjacent to each other or spaced apart frame members 12 of a switchgear cabinet 10. The base members 22 are coupled to the frame members 12 by a plurality of fasteners 38, for example screws or bolts, which facilitate removal or installation of the electrical equipment 20 by a user.

Thus, there is provided a mounting plate system 30 for electrical equipment in a switchgear cabinet 10. The foregoing description of embodiments have been presented for purposes of illustration and description. It is not intended to be exhaustive nor to be limited to the precise forms disclosed, and modifications and variations are possible in light of the above teachings or may be acquired by practice of the invention. The embodiments are chosen and described in order to explain the principles and practical application to enable one skilled in the art to utilize the mounting plate system in various embodiments and with various modifications that are suited to the particular use contemplated. It is intended that the scope of the mounting plate system be defined by the claims appended hereto and their equivalents.

What is claimed is:

1. A mounting plate system for electrical equipment in a switchgear cabinet having spaced apart frame members, the mounting plate system comprising:
   a first mounting plate having a plurality of orifices located proximate an outer edge of the first mounting plate; and
   a second mounting plate having a plurality of orifices located proximate an outer edge of the second mounting plate,
   wherein the first and second mounting plates are configured to couple to the electrical equipment and the frame members from the back of the switchgear cabinet, releasably secure the electrical equipment to the frame member and facilitate removal of the electrical equipment from the front of the switchgear cabinet.

2. The mounting plate system of claim 1, wherein one of the first and second mounting plates defines a through hole configured to accept a wire.

3. The mounting plate system of claim 1, wherein the first and second mounting plate is configured to support an insulation barrier.

4. The mounting plate system of claim 1, wherein the electrical equipment is an insulated base member of a circuit breaker.

5. The mounting plate system of claim 1, wherein the mounting plates are composed of an insulating composite material.

6. An arrangement for mounting electrical equipment in a switchgear cabinet between two frame members, the arrangement for mounting comprising:
   a first mounting plate configured to releasably couple to the electrical equipment and one of the frame members; and
   a second mounting plate configured to releasably couple to the electrical equipment and the other frame member,
   wherein the first mounting plate secures one side of the electrical equipment to one frame member and the second mounting plate secures another side of the electrical equipment to the other frame member, with the mounting plates configured to facilitate installation of the electrical equipment from the rear and removal of the electrical equipment from the front of the switchgear cabinet.

7. The arrangement for mounting electrical equipment of claim 6, wherein one of the first and second mounting plates defines a through hole configured to accept a wire.

8. The arrangement for mounting electrical equipment of claim 6, wherein the first and second mounting plate is configured to support an insulation barrier.

9. The arrangement for mounting electrical equipment of claim 6, wherein the electrical equipment is an insulated base member of a circuit breaker.

10. The arrangement for mounting electrical equipment of claim 6, wherein the mounting plates are composed of an insulating composite material.

11. A method for mounting an electrical equipment to at least two frame members in a switchgear cabinet with the cabinet having a front side and a rear side, the method comprising the steps of:
    providing a first mounting plate;
    coupling the first mounting plate to one side of the electrical equipment;
    coupling the first mounting plate to one of the frame members;
    providing a second mounting plate;
    coupling the second mounting plate to another side of the electrical equipment; and
    coupling the second mounting plate to another of the frame members;
    wherein the first and second mounting plates are configured to couple to the frame members from the rear side of the cabinet and wherein the electrical equipment is releasably secured in the cabinet for removal from the front side of the cabinet.

12. The method of claim 11, including the step of configuring one of the first and second mounting plates with a through hole to accept a wire.

13. The method of claim 11, including the step of decoupling the electrical equipment from the first and second mounting plates and removing the electrical equipment from the front of the cabinet.

14. The method of claim 11, including the step of inserting an insulating barrier into a notch configured in each of the first and second mounting plates.

15. The method of claim 11, wherein the electrical equipment is an insulated base member of a circuit breaker.

16. A switchgear cabinet to house electrical equipment, the cabinet comprising:
    a housing, having a front side and a rear side;
    a pair of spaced apart frame members vertically mounted in the cabinet; and
    a mounting plate system for the electrical equipment comprising:
    a first mounting plate having a plurality of orifices located proximate an outer edge of the first mounting plate; and a second mounting plate having a plurality of orifices located proximate an outer edge of the second mounting plate, wherein the first and second mounting plates are configured to couple to the electrical equipment and the frame members from the rear side of the cabinet and releasably securing the electrical equipment to the frame member for removal from the front side of the cabinet.

17. The switchgear cabinet of claim 16, wherein one of the first and second mounting plates defines a through hole configured to accept a wire.

18. The switchgear cabinet of claim 16, wherein the first and second mounting plate is configured to support an insulation barrier.

19. The switchgear cabinet of claim 16, wherein the electrical equipment is an insulated base member of a circuit breaker.

20. The switchgear cabinet of claim 1, wherein the mounting plates are composed of an insulating composite material.

* * * * *